United States Patent Office

3,764,372
Patented Oct. 9, 1973

3,764,372
METHOD OF IMPROVING THE BOND OF POLYTHIOL SEALANT TO BUILDING MATERIALS
Joseph R. Kenton, Bartlesville, Okla., assignor to Phillips Petroleum Company
No Drawing. Filed Sept. 15, 1971, Ser. No. 180,895
Int. Cl. B32b *13/12;* B44d *1/14*
U.S. Cl. 117—72                                4 Claims

ABSTRACT OF THE DISCLOSURE

An alkaline earth metal hydroxide is added to a primer composition to produce better bonding of polysulfide based sealants to calcareous or argillaceous based building materials. In the preferred embodiment calcium hydroxide is added to a chlorinated rubber-methylene di-[p-phenylene isocyanate] priming composition to produce a concrete primer of increased adhesion for bonding liquid curable polythiol compound based sealant compositions to structural element substrates.

BACKGROUND OF INVENTION

This invention relates to priming compositions for concrete. In accordance with another aspect, this invention relates to processes for bonding liquid curable polythiol compound based sealant compositions to structural element substrates. In accordance with a further aspect, this invention relates to the use of priming compositions to improve the adhesion to concrete of liquid curable polythiol compound based sealant compositions.

Sealing compositions that can be applied by one of the various means e.g., hand trowel or extrusion guns, to gaps between component parts of buildings and shaped to conform to the surfaces of the joints, are used in large quantities in the building and engineering industries. Among the sealing compositions available to those industries are compositions that undergo a chemical change after being used to fill a joint such that there results a rubbery seal resistant to oil and gasoline and the weather. One type of sealing composition that undergoes such a chemical change and is at present available is applied in two parts that are mixed together shortly before use, one of the parts comprising liquid curable polythiol and the other a curing agent for the polymer. However, cured polysulfide polymer based sealants do not readily adhere to a wide range of surfaces against which it is desired to bring them into contact for joint sealing purposes. It is difficult to make a permanent sealant-concrete bond. This problem is commonly solved by using a concrete primer. The function of the primer is to form a barrier between the concrete and the sealant. The primer adheres to the concrete and is capable of forming a good bond with the sealant.

In accordance with the invention, it has been found that improved adhesion of curable liquid polythiol based sealant and caulking compositions to treated concrete can be obtained by coating the concrete with a primer composition containing the hydroxide of an alkaline earth metal before application of the sealant.

Accordingly, an object of this invention is to provide a novel priming composition for concrete which will permit a strong and lasting bond to be formed by a liquid curable polythiol based caulking or sealant composition applied to a substrate treated with the priming composition.

Another object of this invention is to provide a process whereby concrete can be treated so that a strong and lasting bond can be attained between cured polysulfide polymer containing compositions and treated concrete substrates to which they are applied.

A further object of this invention is to provide an adhesion-promoting priming compound which increases the peel strength for a bond between concrete and a curable liquid polythiol based sealant and caulking composition.

Other aspects, objects and the several advantages of this invention will be apparent to those skilled in the art from a study of this disclosure and the appended claims.

SUMMARY OF THE INVENTION

In accordance with the invention, the hydroxide of an alkaline earth metal is incorporated into a concrete priming compostion to improve the bonding characterstics between concrete treated with the priming composition and a curable liquid polythiol compound based sealant and caulking composition.

DESCRIPTION OF THE PREFERRED EMBODIMENTS

Hydroxides of any of the alkaline earth metals—magnesium, calcium, strontium, barium—are suitable as additives for concrete priming compositions to enhance the adhesion of curable liquid polythiol compound based sealant and caulking compositions to concrete by the process of this invention. At present the preferred additive, because of availability and cost, is calcium hydroxide. The alkaline earth metal hydroxide is added to the priming composition in an amount ranging from 0.5 to 15 weight percent.

The priming compositions used in this invention are characterized as a mixture of halogenated rubber and a polyisocyanate compound carried in a suitable solvent or thinner so that the composition can be applied easily to the surface to be treated. Halogenated rubber suitable for use in this invention includes chlorinated butyl rubbers, chlorinated natural rubber, polychloroprene, chlorosulfonated polyethylene and partially chlorinated polyisoprene. At present, the preferred halogenated rubber is a partially chlorinated polyisoprene. The polyisocyanate compounds suitable for use in this invention can include: 2,4- and 2,6-toluene diisocyanates, diphenyl methane-4,4'-diisocyanate, para- and metaphenylene diisocyanate, and hexamethylene diisocyanate among others. At present the diphenyl methane-4,4'-diisocyanate is preferred.

Solvents suitable as carriers are those that are volatile, water-free and do not react with the components of the primer. Examples of these solvents are turpentine, benzene, toluene, acetone, methylene chloride, ethyl acetate and chlorobenzene among others. Both components of the primer can be carried in the same solvent or the solvent for each component can be different. The ratio of halogenated rubber to polyisocyanate in the primer composition can range from about 1 to 5 to about 10 to 1 parts by weight.

The priming compositions of this invention are particularly useful in promoting adhesion between concrete and polysulfide polymers produced from polythiol compounds. These polysulfide polymers are used as sealants and caulking compositions. This invention is particularly applicable to improving adhesion characteristics of sealants based on curable poly(oxalkylene)polyester-poly-(monosulfide)-polythiols having at least three pendant thiol groups per molecule such as those compounds set forth in a copending application having Ser. No. 53,313 filed July 8, 1970, now abandoned. The similarly constituted poly(oxyalkylene)-polyester-polythiols formed by reacting a mercapto alkanoic acid with a poly(oxyalkylene)-polyol are also suitable for use in the present invention.

In practice the solution of halogenated rubber and the solution of polyisocyanate compound are mixed with the alkaline earth metal hydroxide forming a mixture which, if necessary, can be further thinned with a suitable solvent for ease of handling. It is to be understood that this invention is not only appropriate for concrete but also for similar calcareous or argillaceous based building materials such as stone, brick and the like. Priming compositions can be applied to the surface of these materials by painting, spraying, brushing, flowing or in any other manner used to apply a liquid to a surface to provide at least a monomolecular layer, after evaporation of the solvent, on the treated surface.

The following specific example is illustrative of method and compositions of this invention.

Example I

A polythiol based sealant composition was prepared in the following manner. 1,000 grams of xylene, 1000 grams of poly(oxyalkylene)-polyol derived from 1,2,6-hexanetriol and propylene oxide (molecular weight ca. 4500, OH number ca. 34), 10 grams of p-toluenesulfonic acid, and 99 grams of a mixed acid product composed of approximately 19 percent by weight thiodipropionic acid, 46 percent by weight mercaptopropionic acid, and 35 percent by weight ammonium chloride, were refluxed for about 13 hours at 145° C. 600 milliliters of xylene were added to reduce viscosity. 30 grams of calcium hydroxide were added and the mixture was stirred for 20 minutes. The mixture was filtered through a Celite filtercake. Another 20 grams of calcium hydroxide was added and stirring was continued for 40 minutes before the mixture was again filtered through a Celite filtercake. The material was stripped at a pressure of 0.7 mm. mercury on a steam bath yielding a material with a viscosity of 4,200 centipoise at 26.5° C.

This product which is a representative poly(oxyalkylene)-polyester - poly(monosulfide) - polythiol was compounded according to the following formulation:

| | Grams |
|---|---|
| Poly(oxyalkylene) - polyester - poly(monosulfide)-polythiol | 100 |
| $TiO_2$ | 20 |
| $CaCO_3$ | 40 |
| Silica, fumed | 5 |
| Polychlorinated diphenyl (B.P. 365–390° C.) | 15 |
| Sulfur | 0.05 |
| $PbO_2$ and dibutyl phthalate (1:1 by weight) | 7.5 |
| Gamma-glycidoxypropyltrimethoxysilane | 3.0 |
| Water | 1.35 |

A two-component concrete priming material composed of a solution of about 25 weight percent of a partially chlorinated polyisoprene (62 weight percent chlorine) in aromatic hydrocarbon solvent and a solution of methylene di[p-phenylene isocyanate] (ca. 50 weight percent) in chlorobenzene were mixed in a proportion of 15 volumes to 1 volume. A portion of this mixed primer composition, 16 milliliters (ca. 14.8 grams), was mixed with 0.5 gram of calcium hydroxide to obtain a homogeneous mixture. The two component composition will be called Sample A and the composition containing calcium hydroxide will be called Sample B. Concrete slabs were primed with Sample A primer only or with Sample B primer only. After drying the concrete slabs, the primed surface of the slabs and three inch by six inch pieces of canvas were coated with the experimental sealant composition. The sealant coated surfaces of the canvas and concrete slabs were pressed together to make intimate contact removing air bubbles. After aging 7 days in air, a one inch wide strip was formed by cutting through the canvas and sealant with a razor blade. The sample was tested on an Instron Model-TTC after aging 7 days in air; some of the samples were aged an additional 7 days in water and were then tested using the procedure stated above. Results of these tests appear below.

DUPLICATE SAMPLES OF TWO COMPONENT SYSTEM (A)

| | Pounds per inch width | | |
|---|---|---|---|
| Aging conditions | Cohesive failure | Canvas peel | Adhesive failure |
| 7 days in air | 40, 40 | 15, 15 | |
| 7 days in air and 7 days in water | | | 4.5, 3.8 |

DUPLICATE SAMPLES OF THREE COMPONENT SYSTEM (B)

| | Pounds per inch width | | |
|---|---|---|---|
| Aging conditions | Cohesive failure | Canvas peel | Adhesive failure |
| 7 days in air | 40, 37 | 15, 14 | |
| 7 days in air and 7 days in water | | | 6.1, 5.1 |

The higher pounds per inch width values of the (B) duplicate samples after 7 days in air and 7 days in water show the greater adhesive strength caused by a priming system using calcium hydroxide promoted primer as compared to the same primer system without the calcium hydroxide addition. Since the sealants will be used in applications requiring contact with moisture this is a valuable improvement in physical characteristics.

Reasonable variation and modification are possible within the scope of this disclosure and the appended claims of this invention the essence of which is that there is provided a composition and method for improving the adhesion qualities of concrete primer compositions used with polythiol based sealant compositions.

I claim:

1. A method of improving the bonding characteristics of a curable liquid polythiol compound based sealant and caulking composition to calcareous or argillaceous based building materials comprising:

(1) covering the calcareous or argillaceous based building materials with at least a monomolecular layer of a priming composition comprising a mixture of halogenated rubber, a polyisocyanate compound wherein said mixture has a ratio of halogenated rubber to polyisocyanate of from about 1 to 5 to about 10 to 1 parts by weight and from about 0.5 to about 15.0 percent by weight of an alkaline earth metal hydroxide all carried in suitable solvent, (2) allowing the solvent to volatilize, (3) applying the sealant and caulking composition to the primed building materials, and (4) allowing said sealant and caulking composition to cure.

2. The method of claim 1 wherein the calcareous or argillaceous based building material is concrete.

3. The method of claim 1 wherein the alkaline earth metal hydroxide is calcium hydroxide.

4. The method of claim 1 wherein the polyisocyanate compound is diphenyl methane-4,4'-diisocyanate and the halogenated rubber compound is a partially chlorinated polyisoprene.

References Cited

UNITED STATES PATENTS

| 3,518,107 | 6/1970 | Millen | 117—72 |
| 2,757,159 | 7/1956 | Hormats | 117—123 D X |
| 3,329,639 | 7/1967 | Hawkins et al. | 117—123 D X |
| 3,453,243 | 7/1969 | Hartlein | 117—72 X |
| 3,457,099 | 7/1969 | De Angelo et al. | 117—72 X |

RALPH HUSACK, Primary Examiner

U.S. Cl. X.R.

117—77, 123 D, DIG. 7; 260—33.6